(12) United States Patent
Bahk et al.

(10) Patent No.: US 8,169,942 B2
(45) Date of Patent: May 1, 2012

(54) METHOD FOR WIRELESS MULTI-HOP NETWORK

(75) Inventors: Sae-Woong Bahk, Seoul (KR); Kyong-Tak Cho, Goyang-si (KR)

(73) Assignee: SNU R&DB Foundation, Seoul (KR)

( * ) Notice: Subject to any disclaimer, the term of this patent is extended or adjusted under 35 U.S.C. 154(b) by 482 days.

(21) Appl. No.: 12/548,637

(22) Filed: Aug. 27, 2009

(65) Prior Publication Data

US 2010/0290379 A1  Nov. 18, 2010

(30) Foreign Application Priority Data

May 13, 2009  (KR) .................. 10-2009-0041797

(51) Int. Cl.
*H04W 52/02*  (2009.01)
(52) U.S. Cl. ...................................... 370/311
(58) Field of Classification Search .................. 370/311
See application file for complete search history.

(56) References Cited

U.S. PATENT DOCUMENTS

2011/0211513 A1* 9/2011 Coleri Eregen et al. ...... 370/311

OTHER PUBLICATIONS

Shu Du et al., 'RMAC: A Routing-Enhanced Duty-Cycle MAC Protocol for Wireless Sensor Networks', IEEE INFOCOM, 2007, pp. 1478-1486.*
Wei Ye et al., 'An Energy-Efficient MAC Protocol for Wireless Sensor Networks', IEEE INFOCOM, 2002, pp. 1567-1576.*
Lening Wang et al., 'An Adaptive Energy-Efficient and Low-Latency MAC Protocol for Wireless Sensor Networks', IEEE, 2007, pp. 2440-2443.*
Zhihui Chen et al., 'Self Organization and Energy Efficient TDMA MAC Protocol by Wake Up for Wireless Sensor Networks', IEEE, 2004, pp. 335-341.*
Jifeng Sun et al., 'EL-MAC Protocol for Wireless Sensor Network', IEEE, 2008, pp. 1-4.*
Michael Buettner et al., 'X-MAC: A Short Preamble MAC Protocol for Duty-Cycled Wireless Sensor Networks', ACM, 2006, 14 pages.*

* cited by examiner

*Primary Examiner* — Melvin Marcelo
(74) *Attorney, Agent, or Firm* — Sherr & Vaughn, PLLC

(57) ABSTRACT

Technology for a wireless multi-hop network is disclosed. a plurality of nodes in the wireless multi-hop network are synchronized to a period sequentially including a first interval and a second interval and are in an active state at the start time of the first interval. a node transmits a control frame at the start time of the first interval, the control frame indicating that data will be transmitted in the second interval, and then transitions to a sleep state which is maintained until a wake-up time in response to determining that the control frame has been successfully received by a next hop node. The wake-up time is a point in time when a node transitions to an active state to transmit the data and is present in the second interval.

18 Claims, 7 Drawing Sheets

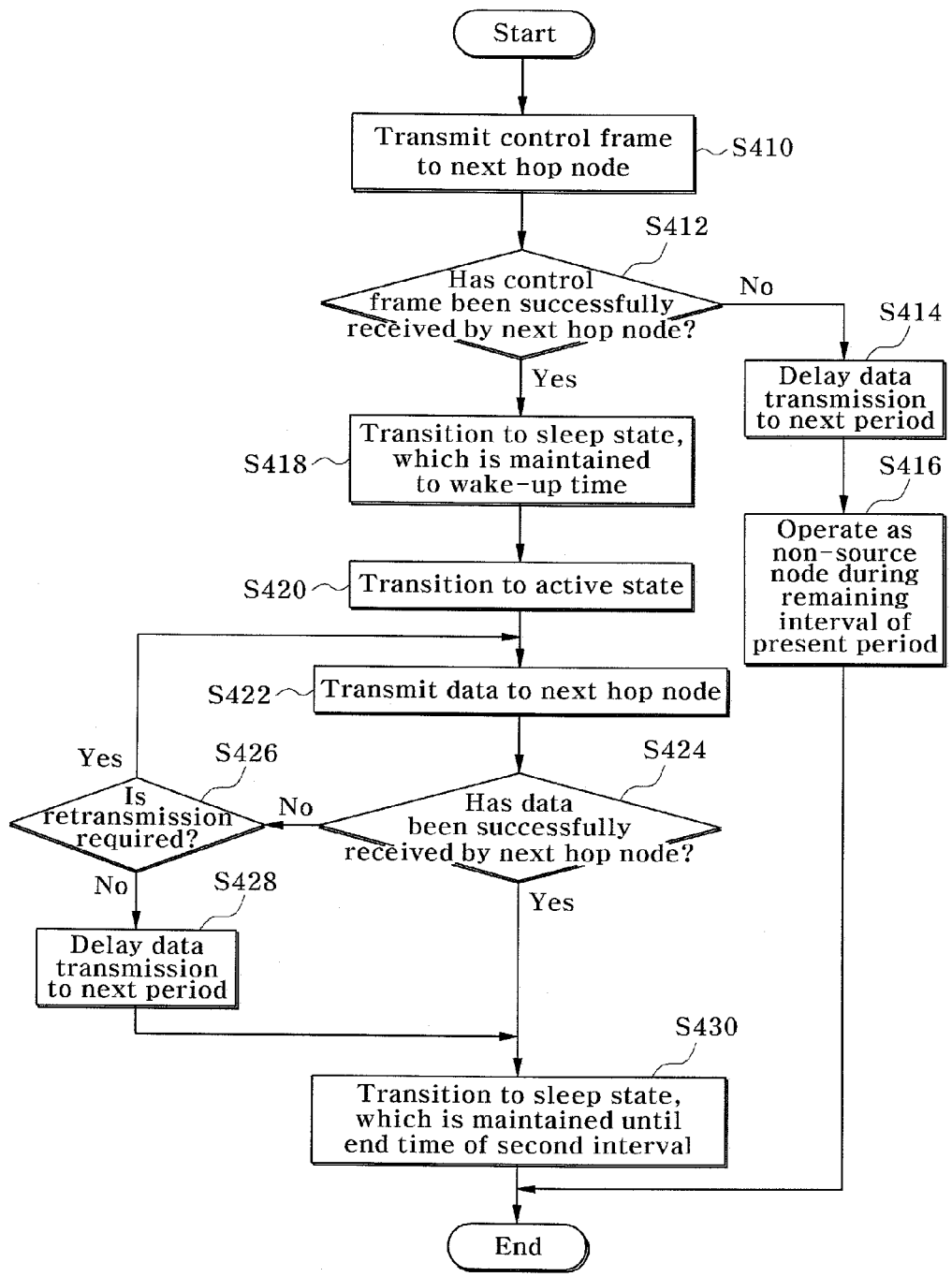

FIG. 6

|  | Amount of power consumption (W) | Time of transmission delay (Sec) |
|---|---|---|
| RMAC | 0.069 | 35.10 |
| HE-MAC | 0.059 | 28.23 |
| Reduction rate | 14.3% | 19.6% |

US 8,169,942 B2

METHOD FOR WIRELESS MULTI-HOP NETWORK

CROSS-REFERENCE TO RELATED APPLICATION

This application claims the benefit of Korean Patent Application No. 2009-0041797, filed on May 13, 2009, which is hereby incorporated by reference as if fully set forth herein.

BACKGROUND OF THE INVENTION

1. Field of the Invention

The disclosed technology relates to a wireless multi-hop network, and more particularly, but not exclusively, to a method for operating a plurality of nodes synchronized to a specific period in a wireless multi-hop network.

2. Discussion of Related Art

In a wireless multi-hop network such as a wireless sensor network and a mobile ad-hoc network, data from a source node may reach a destination node through relay of intermediate nodes.

A wireless multi-hop network is designed by considering transmission performance such as end-to-end transmission delay, a transmission rate, and the like, as in other communication systems, and by further considering energy efficiency when nodes in the wireless multi-hop network are energy-restricted.

SUMMARY OF THE INVENTION

The disclosed technology is directed to a method for operating nodes in a wireless multi-hop network including a plurality of synchronized nodes.

A first aspect of the disclosed technology provides a method for operating a node among a plurality of nodes in a wireless multi-hop network, wherein the plurality of nodes are synchronized to a period sequentially including a first interval and a second interval and are in an active state at the start time of the first interval, the method comprising: transmitting a control frame at the start time of the first interval, the control frame indicating that data will be transmitted in the second interval; and transitioning to a sleep state in response to determining that the control frame has been successfully received by a next hop node and maintaining the sleep state until a wake-up time, wherein the wake-up time is a point in time when a node transitions to an active state to transmit the data and is present in the second interval.

A second aspect of the disclosed technology provides a method for operating a node among a plurality of nodes in a wireless multi-hop network, wherein the plurality of nodes are synchronized to a period sequentially including a first interval and a second interval and are in an active state at the start time of the first interval, the method comprising: in response to receiving a control frame in the first interval, delivering the control frame to the next hop node, wherein the control frame indicates that data will be transmitted in the second interval; and in response to determining that the control frame has been successfully delivered to the next hop, transitioning to a sleep state and maintaining the sleep state until a wake-up time, wherein the wake-up time is a point in time when a node transitions to an active state to receive the data and is present in the second interval.

A third aspect of the disclosed technology provides a method for operating a node among a plurality of nodes in a wireless multi-hop network, wherein the plurality of nodes are synchronized to a period sequentially including a first interval and a second interval and are in an active state at the start time of the first interval, the method comprising: in case that there is no control frame received during a first subinterval, waiting for a control frame to be received in a temporary interval in response to overhearing a control frame transmission in a second subinterval, wherein the control frame indicates that data will be transmitted in the second interval and the temporary interval ends at an end time of a third subinterval; delivering a control frame to a next hop node in response to receiving the control frame in the temporary interval; and in response to determining that that the control frame has been successfully received by the next hop node, transitioning to a sleep state and maintaining the sleep state until a wake-up time, wherein the wake-up time is a point in time when a node transitions to an active state to receive the data and is present in the second interval, wherein the first subinterval is an interval from a start time of the first interval to a point in time earlier than an end time of the first interval by a predetermined time length, the second subinterval is the remaining interval of the first interval excluding the first subinterval, and the third subinterval is an interval from a start time of the second interval to a point in time later than the start time of the second interval by the predetermined time length.

A fourth aspect of the disclosed technology provides a method for operating a node among a plurality of nodes in a wireless multi-hop network, wherein the plurality of nodes are synchronized to a period sequentially including a first interval and a second interval and are in an active state at the start time of the first interval, the method comprising: in case that there is no control frame received during a first subinterval, waiting for a control frame to be received in a temporary interval in response to overhearing a control frame transmission in a second subinterval, wherein the control frame indicates that data will be transmitted in the second interval and includes information for determining whether a node receiving the control frame is a last receiving node in a present period, and the temporary interval ends at an end time of a third subinterval; determining whether the node is a last receiving node in the present period based on the received control frame, in response to receiving the control frame in the temporary interval; and in response to determining that the node is a last receiving node in the present period, transmitting the received control frame and then transitioning to a sleep state, which is maintained to a wake-up time, the wake-up time being a point in time when a node transitions to an active state to receive the data and being in the second interval, wherein the first subinterval is an interval from a start time of the first interval to a point in time earlier than an end time of the first interval by a predetermined time length, the second subinterval is the remaining interval of the first interval excluding the first subinterval, and the third subinterval is an interval from a start time of the second interval to a point in time later than a start time of the second interval by the predetermined time length.

BRIEF DESCRIPTION OF THE DRAWINGS

FIG. 4 is a flowchart illustrating a method for operating nodes according to an exemplary embodiment;

FIG. 6 illustrates a table showing a comparison in performance between disclosed technology (HE-MAC) and RMAC.

DETAILED DESCRIPTION OF EXEMPLARY EMBODIMENTS

The present invention will now be described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure will be sufficiently thorough and complete to fully enable those skilled in the art to embody and practice the invention.

Meanwhile, the terminology used herein is chosen to describe particular exemplary embodiments only and is not intended to limit the scope of the invention.

The terms "first" and "second" may be used herein to distinguish one element from another, and should not be construed as limiting the present invention. For example, a "first" element could be termed a "second" element and vice versa without departing from the teachings of the present invention.

The term "and/or" includes any and all combinations of one or more of associated listed items. For example, "a first item, a second item and/or a third item" means "at least one of the first item, the second item, and the third item." That is, it means any and all combinations of two or more of the first, the second, and the third item, as well as any one of the first, the second, and the third item.

Although articles like "a", "an" and "the" indicate that an element is singular, it may in fact be plural, unless the context clearly indicates otherwise. It will be further understood that the terms "comprise", "include", and "have", when used in this specification, specify the presence of stated features, numbers, steps, operations, elements, and/or components, but do not preclude the presence or addition of one or more other features, numbers, steps, operations, elements, components, and/or groups thereof.

Process steps described in this disclosure may be performed differently from a specified order, unless a specific order is clearly stated in the context of the disclosure. That is, each step may be performed in a specified order, at substantially the same time, or in a reverse order.

Unless otherwise defined, all terms (including technical and scientific terms) used herein have the same meanings as commonly understood by one of ordinary skill in the art to which this invention pertains. It will be further understood that terms defined in common dictionaries should be interpreted within the context of the relevant art and not in an idealized or overly formal sense unless expressly so defined herein.

The disclosed technology may be applied to environments in which nodes in a wireless multi-hop network are synchronized to a specific period for operation. The disclosed technology will be described hereinafter with respect to a wireless sensor network. However, it will be apparent to those skilled in the art that the disclosed technology is not limited to the wireless sensor network.

Figure 1:
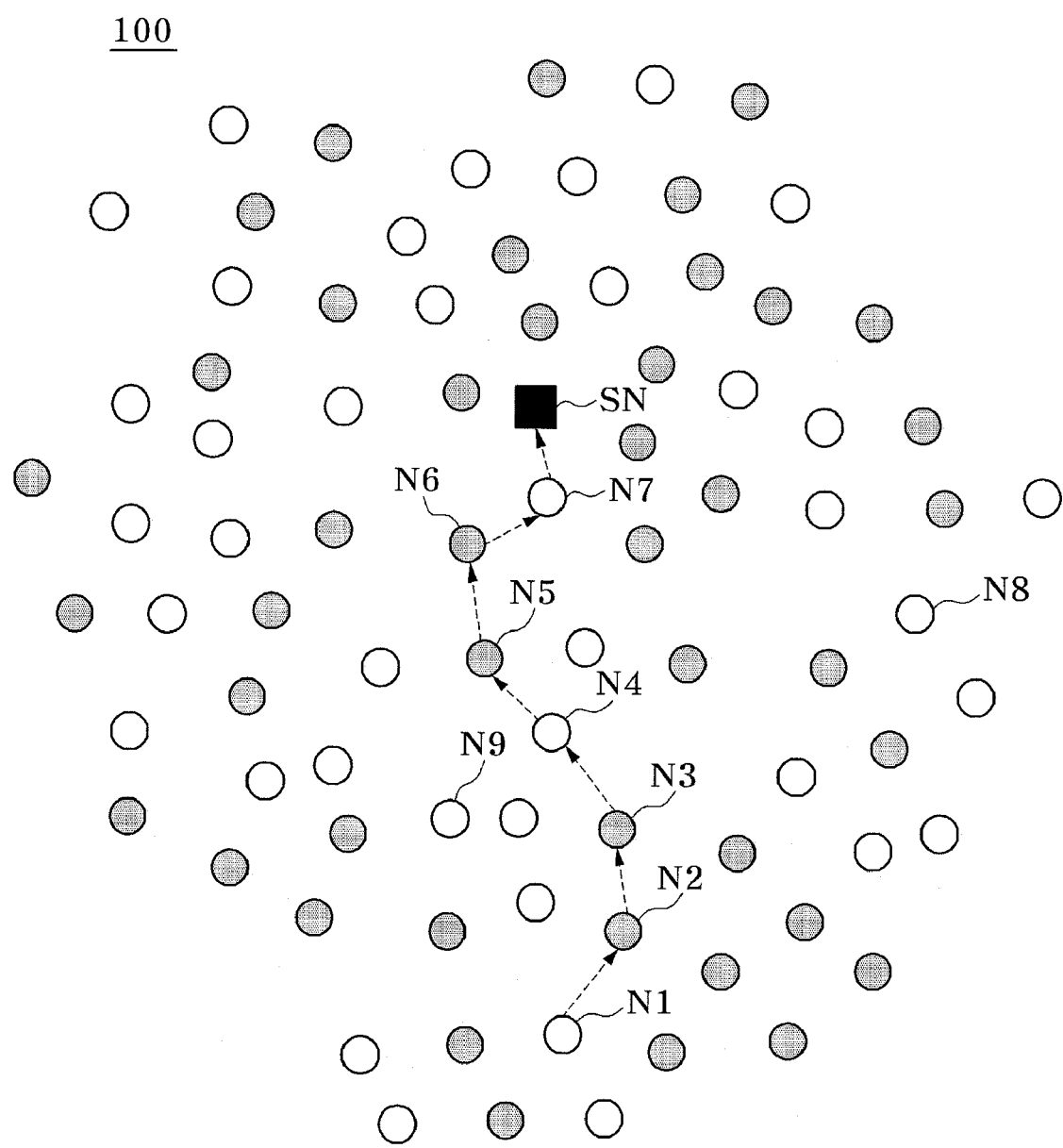
FIG. 1 illustrates a wireless sensor network.

FIG. 1 illustrates a wireless sensor network.

In FIG. 1, circles indicate nodes corresponding to sensor nodes of a wireless sensor network 100, and a rectangle indicates a node corresponding to a sink node of the wireless sensor network 100.

Referring to FIG. 1, data from a first node N1 arrives at a sink node SN through wireless relay in second to seventh nodes N2 to N7. In this case, the first node N1 corresponds to a source node and the sink node SN corresponds to a destination node.

Normal wireless relay requires the respective nodes to be at least in a receivable state, i.e., a listening state so that the nodes can determine whether there is data transmitted from neighboring nodes.

The nodes consume energy in an idle listening state. To reduce energy consumption, duty-cycle-based media access control (MAC) protocol has been proposed.

Examples of the duty-cycle-based MAC protocol include S-MAC proposed in a paper of Wei Ye, John S. Heidemann, and Deborah Estrin, "An Energy-Efficient MAC protocol for Wireless Sensor Networks," in INFOCOM 2002 pp 2. 1567-1576, June 2002, and RMAC proposed in a paper of She Du, Amit Kumar Saha, and David B. Johnson, "RMAC: A Routing-Enhanced Duty-Cycle MAC Protocol for Wireless Sensor Networks," in INFOCOM 2007 pp. 1478-1486, May 2007. Contents of these papers are incorporated hereby in their entirety by reference without departing from the scope of the disclosed technology.

Figure 2:
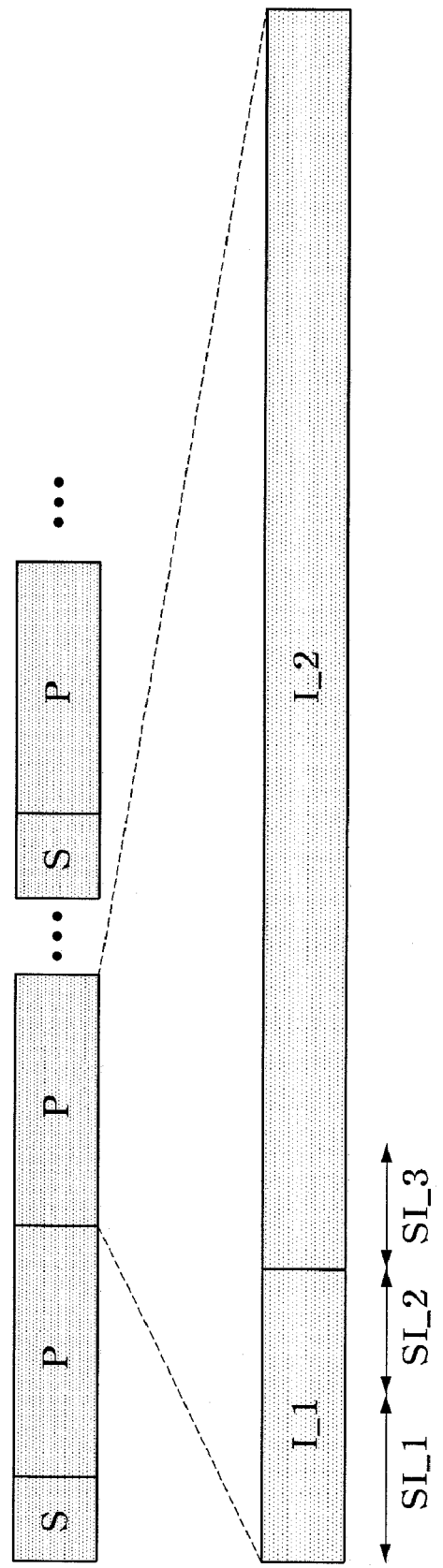
FIG. 2 illustrates a period to which nodes are synchronized according to an exemplary embodiment.

FIG. 2 illustrates a period to which nodes are synchronized according to an exemplary embodiment.

Nodes synchronize timings of periods P during a synchronization interval S. The nodes perform operation required for data transmission over a wireless multi-hop network during each period P.

In an exemplary embodiment, the period P includes a first interval $I\_1$ and a second interval $I\_2$. The first interval $I\_1$ and the second interval $I\_2$ may correspond to a data interval and a sleep interval in an RMAC, respectively. According to the RMAC, a data delivery path illustrated in FIG. 1 is reserved by transmitting a control frame called Pioneer (PION) during the data interval. According to RMAC, nodes located on the reserved data delivery path transition to an active state on a wake-up time to perform data transmission or relay during the sleep interval and other nodes remain in a sleep state during the sleep interval.

In the active state, reception and overhearing operations can be performed, and transmission operation can also be performed when there is a signal (e.g., a control frame, data, and an acknowledgement (ACK) signal) to be transmitted. Here, in the overhearing operation, a signal directed to another node is overheard.

In the sleep state, reception and transmission operations may be not performed to reduce power consumption.

In an exemplary embodiment, the first interval $I\_1$ consists of a first subinterval $SI\_1$ and a second subinterval $SI\_2$. The second interval $I\_2$ may include a third subinterval $SI\_3$ starting from a start time of the second interval $I\_2$.

In an exemplary embodiment, the second subinterval $SI\_2$ and the third subinterval $SI\_3$ may have the same predetermined time length. In this case, the second subinterval $SI\_2$ has a start time earlier than an end time of the first interval $I\_1$ by the predetermined time length, and the third subinterval $SI\_3$ has an end time later than the start time of the second interval $I\_2$ by the predetermined time length.

In an exemplary embodiment, the predetermined time length is a sum of double duration of the control frame and spacing between the control frames. Here, the spacing between the control frames is a time interval between adjacent control frames for which wireless medium may be idle.

In exemplary embodiments described below, it is assumed that a plurality of nodes are synchronized to each period P, know a boundary point between the first subinterval $SI\_1$ and the second subinterval SI_2 and the end time of the third subinterval SI_3, and are in an active state at the start time of the first interval I_1.

Figure 3:
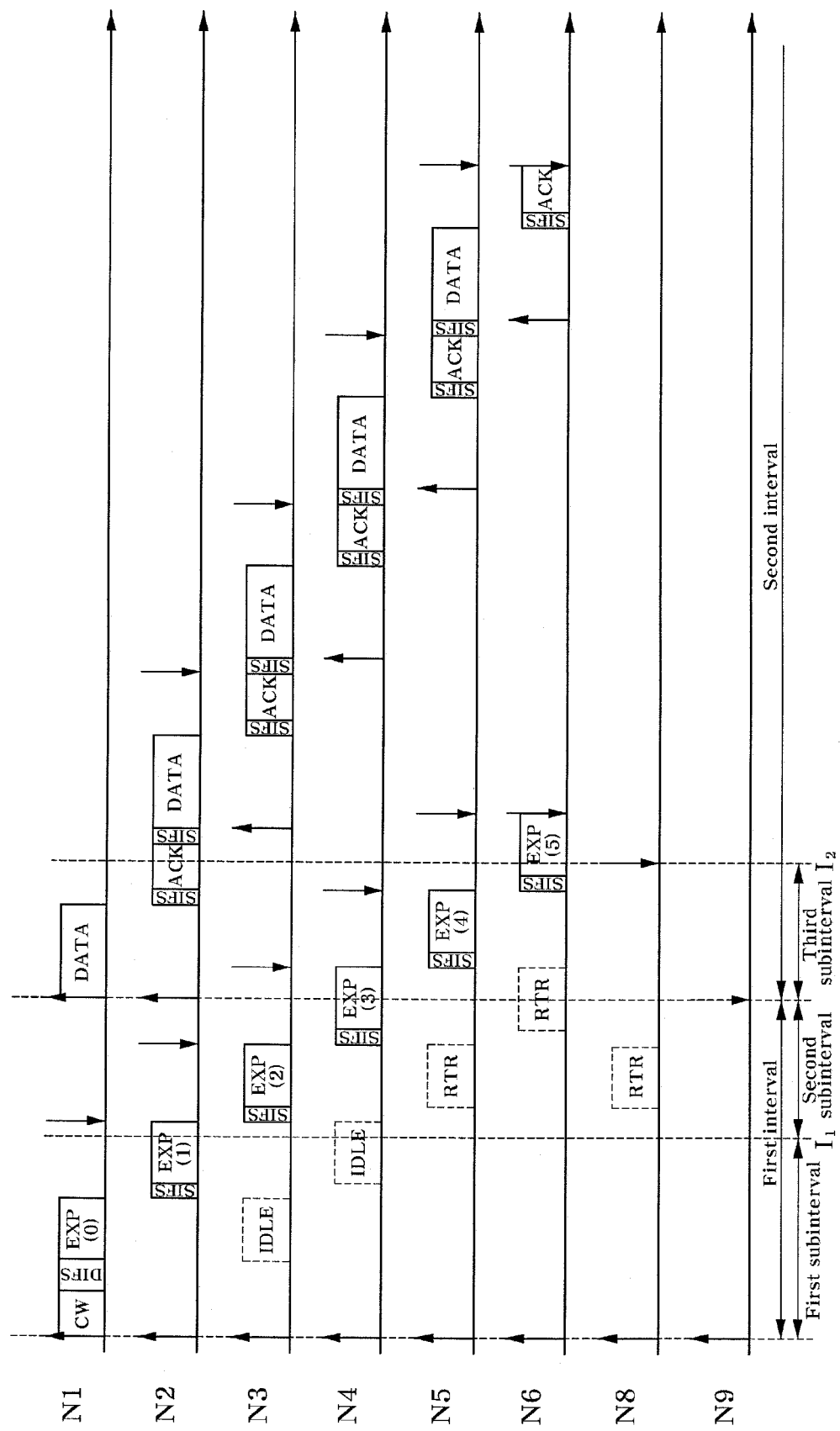
FIG. 3 illustrates a node operation process in one period in some exemplary embodiments.

FIG. 3 illustrates a node operation process during one period in some exemplary embodiments.

In FIG. 3, operation of the nodes N1, N2, N3, N4, N5, N6, N8, and N9 of FIG. 1 during one period is shown.

Upward arrows indicate a point in time when a node transitions to an active state, and downward arrows indicate a point in time when a node transitions to a sleep state.

Rectangles EXP, DATA, and ACK indicate a control frame, data, and an ACK signal transmitted by a node, respectively.

Dotted rectangles indicate a point in time when a node can overhear a control frame. When a node such as the third node N3 or the fourth node N4 overhears a control frame in the first subinterval SI_1, the node remains idle IDLE state. When a node such as the fifth node N5 or the sixth node N6 which does not have any control frame received or overheard during the first subinterval SI_1 overhears a control frame in the second subinterval SI_2, the node transtions from an idle state to ready-to-receive RTR state in which the node to wait for receiving a control frame in a temporary interval.

$I_1$ and $I_2$ denote a start time and an end time of the temporary interval, respectively.

CW denotes a time length over which a source node competes through competition-based MAC, and DIFS denotes a time length between an end time of the competition and a point in time when the control frame can be transmitted.

SIFS indicates spacing between control frames, (i.e., time spacing) and spacing between data and an ACK signal.

FIG. 4 is a flowchart illustrating a method for operating nodes according to an exemplary embodiment.

In FIG. 4, operation of a node having data to transmit in a present period (e.g., the node indicated by reference numeral N1 in FIGS. 1 and 3) is illustrated.

Referring to FIG. 4, when a node is in an active state at the start time of the first interval I_1 and has data to be transmitted, the node transmits a control frame to a next hop node (S410). Here, the control frame indicates that data will be transmitted in a second interval I_2.

In an exemplary embodiment, this control frame may include information included in PION, a maximum number maxHop of hops to which the control frame can be delivered in the present period, and a hop count i which indicates number of hops traversed by the control frame.

Examples of the information included in PION may include identifiers (e.g., MAC addresses) of transmitting and receiving nodes, an identifier of a destination node (e.g., an address of an upper layer than MAC), and a unit transmission time length (e.g., a network allocation vector). Referring to FIG. 3, a unit transmission time length is equal to a sum of data duration, a double SIFS and duration of the ACK signal.

In an exemplary embodiment, the maximum hop number maxHop may be 2 greater than the number of hops to which the control frame can be delivered during the first interval I_1, by introducing an RTR state and a temporary interval.

The maximum hop number maxHop is given by the following equation based on the illustration shown in FIG. 3:

$$\text{maxHop} = \left\lfloor \frac{T_{data} - CW - DIFS}{durEXP + SIFS} \right\rfloor + 2 \qquad \text{Equation 1}$$

where $T_{data}$ denotes a time length of the first interval I_1, durEXP denotes a duration of the control frame, and other variables are described above.

Also, $\lfloor x \rfloor$ is a function that outputs a maximum integer smaller than or equal to x.

the node determines whether the control frame has been successfully received by the next hop node (S412). In an exemplary embodiment, when a control frame transmitted from the next hop node is overheard, the node determines that the control frame transmitted in step S410 has been successfully received by the next hop node.

When it is determined that the control frame has not been successfully received by the next hop node (S412), the node delays data transmission to a next period (S414), performs operation of a non-source node during a remaining interval of the present period P (S416). For example, the node performs operation in an exemplary embodiment that will be illustrated in FIGS. 5A and 5B.

When it is determined that the control frame has been successfully received by the next hop node (S412), the node transitions to a sleep state, which is maintained to a wake-up time (S418). For example, referring to FIGS. 1 and 3, the first node N1 overhears the control frame from the second node N2 to the third node N3 and then transitions to a sleep state.

Here, the wake-up time is a point when the node transitions to an active state to transmit the data, and is present in the second interval I_2.

In an exemplary embodiment, the wake-up time is later than a start time of the second interval I_2 by a predetermined time length. In an exemplary embodiment, the predetermined time length is somewhat greater than the duration durEXP of the control frame.

At the wake-up time, the node transitions to the active state (S420) and transmits the data to the next hop node (S422).

The node determines whether the data has been successfully received by the next hop node (S424). In an exemplary embodiment, the node determines whether the data has been successfully received by the next hop node based on whether an ACK signal is received from the next hop node.

When it is determined that the data transmitted in step S422 has not been successfully received by the next hop node (S424), the node determines whether retransmission is required (S426). This determination may be made based on whether the number of previous retransmissions is greater than a predetermined threshold, but the present invention is not limited thereto.

When it is determined that the retransmission is not required (S426), the node delays the data transmission to a next period (S430), and transitions to a sleep state, which is maintained until the second interval I_2 ends (S432).

When it is determined that the retransmission is required (S426), the node returns to step S422 to retransmit the data to the next hop node.

When it is determined that the data transmitted in step S422 has been successfully received by the next hop node (S424), the node transitions to a sleep state, which is maintained until the second interval I_2 ends. For example, referring to FIGS. 1 and 3, the first node N1 transitions to the sleep state after receiving an ACK signal from the second node N2.

Figure 5A:
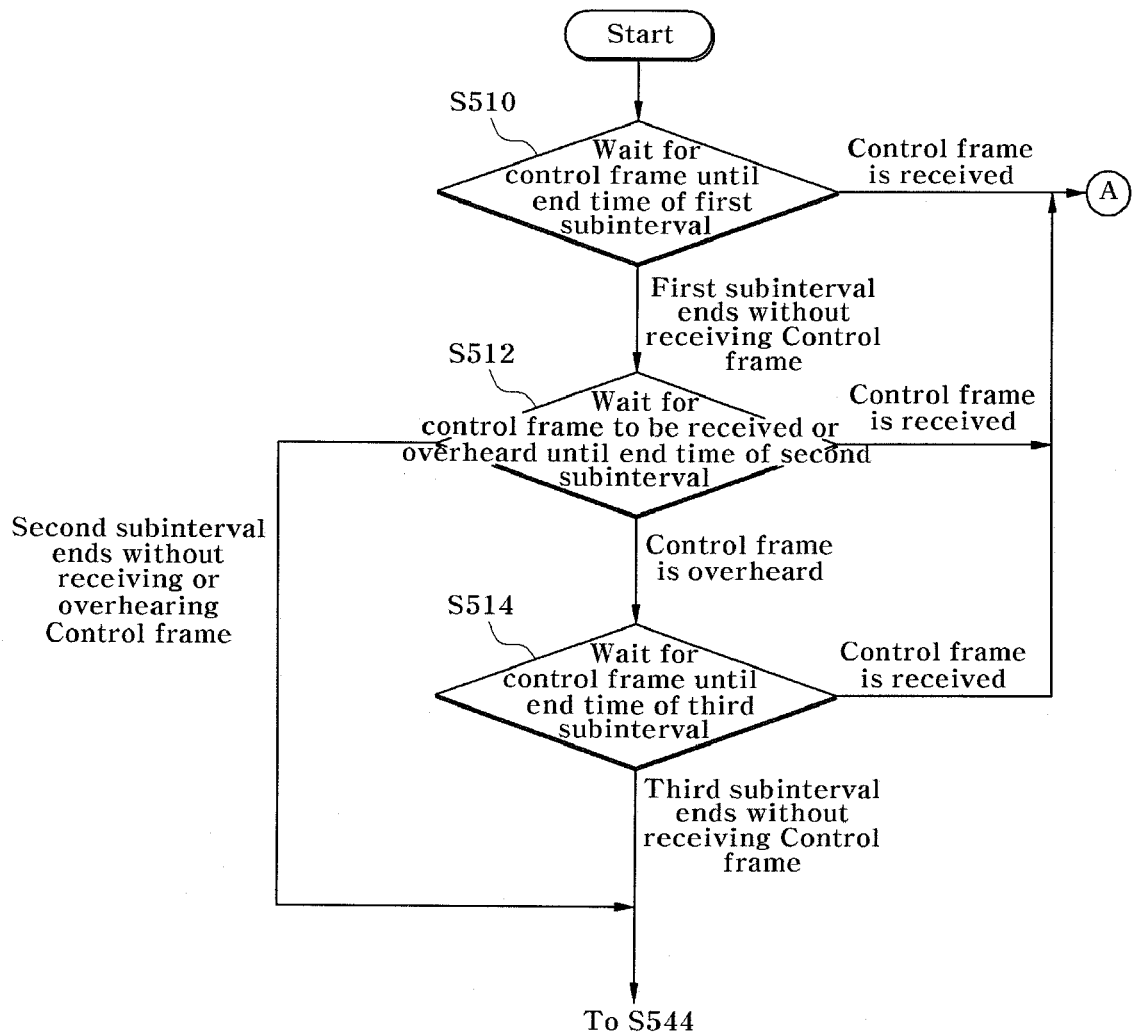
FIGS. 5A and 5B is a flowchart illustrating a method for operating nodes according to another exemplary embodiment.
Figure 5B:
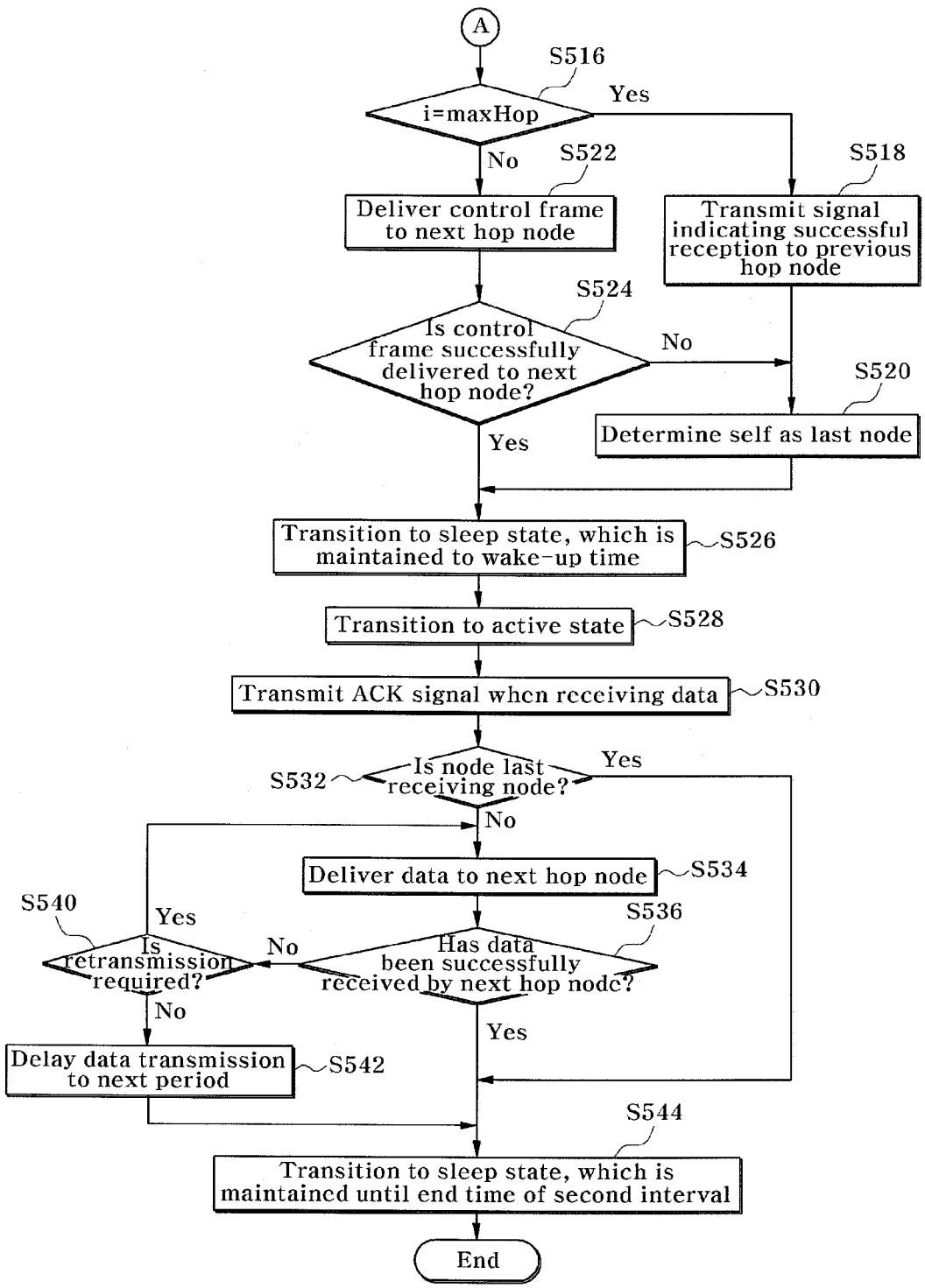

FIGS. 5A and 5B is a flowchart illustrating a method for operating nodes according to another exemplary embodiment.

In FIGS. 5A and 5B, operation of a node having no data to transmit in a present period (e.g., any of the nodes indicated by reference numerals N2, N3, N4, N5, N6, N8, and N9 in FIGS. 1 and 3) is illustrated.

Referring to FIGS. 5A and 5B, when a node is in an active state at the start time of the first interval I_1 and has no data to be transmitted, the node waits for receiving a control frame in the first subinterval SI_1 (S510). The control frame has been illustrated in FIG. 4.

When the control frame is received in the first subinterval SI_1 (S510), the node proceeds to step S516. Examples of the node performing this operation may include the second and third nodes N2 and N3 in FIGS. 1 and 3.

When the control frame is not received in the first subinterval SI_1 (S510), the node waits for a control frame which is received or overheard in the second subinterval SI_2 (S512). Examples of the node performing this operation may include the fourth, fifth, sixth, eighth, and ninth nodes N4, N5, N6, N8, and N9 in FIGS. 1 and 3.

When the control frame is not received and the second subinterval SI_2 ends (S512), the node proceeds to step S544. An example of the node performing this operation may include the ninth node N9 in FIGS. 1 and 3.

When the control frame is received in the second subinterval SI_2 (S512), the node proceeds to step S516. An example of the node performing this operation may include the fourth node N4 in FIGS. 1 and 3. In this case, the fourth node N4 delivers the control frame to the fifth node N5 instead of directly transitioning to the sleep state even when the first interval I_1 ends.

When the control frame is overheard in the second subinterval SI_2 (S512), the node proceeds to step S514. Examples of the node performing this operation may include the fifth, sixth and eighth nodes N5, N6, and N8 in FIGS. 1 and 3.

The node waits for receiving a control frame in the temporary interval (S514). In an exemplary embodiment, the temporary interval is an interval between an overhearing time and an end time of the third subinterval SI_3.

When the control frame is not received in the temporary interval and the third subinterval SI_3 ends (S514), the node proceeds to step S544. An example of the node performing this operation may include the eighth node N8 in FIGS. 1 and 3.

When the control frame is received in the temporary interval (S514), the node proceeds to step S516. Examples of the node performing this operation may include the fifth and sixth nodes N5 and N6 in FIGS. 1 and 3.

The node compares a hop count i in the received control frame with a maximum hop number maxHop in the received control frame (S516).

When the hop count i is equal to the maximum hop number maxHop (S516), the node transmits a signal indicating successful reception to the previous hop node (S518), determines itself as the last receiving node in the present period (S520), and transitions to the sleep state, which is maintained to a wake-up time (S526). In an exemplary embodiment, the node indicates the successful reception by transmitting the received control frame to be overheard at the previous hop node.

When the hop count i is smaller than the maximum hop number maxHop (S516), the node delivers the received control frame to the next hop node (S522), and determines whether the control frame is successfully delivered (S524).

When it is determined that the control frame has not successfully delivered to the next hop node (S524), the node determines itself as the last receiving node in the present period (S520), and transitions to a sleep state, which is maintained to a wake-up time (S526).

When it is determined that the control frame has been successfully delivered to the next hop node (S524), the node transitions to a sleep state, which is maintained to a wake-up time (S526).

At the wake-up time, the node transitions to an active state (S528), and transmits an ACK signal when receiving data (S530).

In an exemplary embodiment, the wake-up time is calculated based on the hop count i, prior to step S526. For example, the wake-up time may be calculated in step S516.

In an exemplary embodiment, when the previous hop node is determined to be a source node, the node determines a point in time later than a start time of the second interval SI_2 by a predetermined time length, as the wake-up time, and otherwise, a point in time later than the start time of the second interval SI_2 by a time length W(i) given by the equation W(i)=(i−1)A+B (where i denotes the hop count, A includes a time required for data transmission and determination as to whether data is successfully transmitted, and B denotes the predetermined interval), as the wake-up time. In an exemplary embodiment, referring to FIG. 3, A is equal to a sum of a double SIFS, duration of the data, and duration of the ACK signal.

In an exemplary embodiment, the predetermined time length is between the start time of the second interval I_2 and a point in time when the data is transmitted from the source node.

The node determines whether it is a last receiving node in a present period (S532).

When it is determined that the node is the last receiving node in the present period (S532), the node transitions to the sleep state, which is maintained until the second interval I_2 ends (S544).

When the node is not the last receiving node in the present period (S532), the node delivers the data to the next hop node (S534), and the node determines whether the data has been successfully received by the next hop node (S536). An example of the method for determining whether the data has been successfully received by the next hop node has been illustrated in FIG. 4.

When it is determined that the data transmitted in step S534 has not been successfully received by the next hop node (S536), the node determines whether retransmission is required (S540).

When it is determined that the retransmission is not required (S540), the node delays the data transmission to a next period (S542), and transitions to a sleep state, which is maintained until the second interval I_2 ends (S544).

When the retransmission is required (S540), the node returns to step S534 to deliver the data to the next hop node again.

When it is determined that the data transmitted in step S534 has been successfully received by the next hop node (S536), the node transitions to the sleep state, which is maintained until second interval I_2 ends (S544).

FIG. 6 is a table showing a comparison in performance between the disclosed technology (HE-MAC) and RMAC.

In FIG. 6, a simulation result for an average amount of power consumption and an end-to-end average time of transmission delay using an ns-2 program, version 2.29, is shown.

For simulation, a number of hops to which a control frame can be delivered during the first interval I_1 was 4, a duty cycle, i.e., a ratio of a length of the first interval I_1 to a time length of a period P was 1%, and a network topology in which 300 nodes are randomly distributed in an area of 2500 m×2500 m was considered.

Referring to FIG. 6, it can be seen that the disclosed technology is more excellent than RMAC in a power consumption amount or a transmission delay time.

The present invention may be implemented as computer-readable code on a computer-readable recording medium.

The computer-readable recording medium may include any of all kinds of recording devices that store computer-readable data. Examples of the computer-readable recording medium include a read-only memory (ROM), a random access memory (RAM), a compact disk-read only memory (CD-ROM), a magnetic tape, a floppy disk, and an optical data storage. Another example of the medium is carrier waves (e.g., Internet transmission). Further, the computer-readable recording medium may be distributed over networked computer systems so that the computer-readable code can be stored and executed in a de-centralized manner. Functional programs, codes, and code segments for implementing the present invention may be easily inferred by programmers in the art to which the present invention belongs.

Not all exemplary embodiments of the present invention necessarily have all of the advantages of the present invention. Thus, the present invention should not be construed as limited by its advantages.

A wireless multi-hop network having small end-to-end transmission delay can be provided. Also, an energy-efficient wireless multi-hop network can be provided.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A method for operating a node among a plurality of nodes in a wireless multi-hop network, wherein the plurality of nodes are synchronized to a period sequentially including a first interval and a second interval, and the plurality of nodes are in an active state at a start time of the first interval, the method comprising:
    transmitting a control frame at the start time of the first interval, the control frame indicating that data will be transmitted in the second interval; and
    transitioning to a sleep state in response to determining that the control frame has been successfully received by a next hop node, and maintaining the sleep state until a wake-up time, wherein the wake-up time arrives in the second interval, and a node transitions to an active state to transmit the data at the wake-up time.

2. The method of claim 1, wherein the wake-up time is later than a start time of the second interval by a predetermined time length.

3. The method of claim 1, comprising:
    delaying the data transmission to a next period, in response to determining that the control frame has not been successfully received by the next hop node.

4. The method of claim 1, wherein determining that the control frame has been successfully received by the next hop node comprises:
    determining that the control frame has been successfully received by the next hop node, in response to overhearing a control frame transmission from the next hop node.

5. The method of claim 1, comprising:
    transitioning to an active state at the wake-up time and transmitting the data to the next hop node; and
    transitioning to a sleep state in response to determining that the data has been successfully received by the next hop node and maintaining the sleep state until an end time of the second interval.

6. The method of claim 1, comprising:
    waiting to receive a control frame from a neighboring node in the first interval, in response to determining that the control frame has not been successfully received by the next hop node.

7. The method of claim 1, wherein the control frame comprises information for determining whether a node receiving the control frame is a last receiving node in a present period.

8. The method of claim 7, wherein the information comprises a maximum number of hops to which the control frame can be delivered in the present period, and a hop count.

9. The method of claim 8, wherein the maximum hop number is 2 greater than the number of hops to which the control frame can be delivered during the first interval.

10. The method of claim 1, wherein the wireless multi-hop network comprises a wireless sensor network, and the plurality of nodes comprise sensor nodes.

11. A method for operating a node among a plurality of nodes in a wireless multi-hop network, wherein the plurality of nodes are synchronized to a period sequentially including a first interval and a second interval, and the plurality of nodes are in an active state at the start time of the first interval, the method comprising:
    in response to receiving a control frame in the first interval, delivering the control frame to a next hop node, wherein the control frame indicates that data will be transmitted in the second interval; and
    in response to determining that the control frame has been successfully delivered to the next hop node, transitioning to a sleep state and maintaining the sleep state until a wake-up time, wherein the wake-up time arrives in the second interval, and a node transitions to an active state to receive the data at the wake-up time.

12. The method of claim 11, wherein the control frame comprises information on a hop count, and transitioning to a sleep state comprises:
    determining that a previous hop node is a source node based on the information;
    determining, as the wake-up time, a point in time later than a start time of the second interval by a first predetermined length of time, in response to determining that the previous hop node is a source node; and
    determining, as the wake-up time, in response to determining that the previous hop node is not a source node, a point in time later than a start time of the second interval by a calculated length of time, $W(i)$, given by the equation $W(i)=(i-1)A+B$, where $i$ denotes the hop count, $A$ includes a time required for transmitting data to a next hop node and determining that the data is successfully received by the next hop node, and $B$ denotes the first predetermined length of time.

13. The method of claim 12, wherein the first predetermined length of time is equal to a length of time between a start time of the second interval and a point in time when the data is transmitted from a source node.

14. The method of claim 11, comprising, in a case where no control frame is received during a first sub-interval, waiting for a control frame to be received in a temporary interval in response to overhearing a control frame transmission in a second sub-interval,
    wherein the temporary interval ends at an end time of a third sub-interval,
    wherein the first sub-interval is an interval from a start time of the first interval to a point in time earlier than an end time of the first interval by a second predetermined length of time, the second sub-interval is the remaining interval of the first interval excluding the first sub-interval, and the third sub-interval is an interval from a start time of the second interval to a point in time later than the start time of the second interval by the second predetermined length of time.

15. A method for operating a node among a plurality of nodes in a wireless multi-hop network, wherein the plurality of nodes are synchronized to a period sequentially including a first interval and a second interval, and the plurality of nodes are in an active state at the start time of the first interval, the method comprising:

in a case where there is no control frame received during a first sub-interval, waiting for a control frame to be received in a temporary interval in response to overhearing a control frame transmission in a second sub-interval, wherein the control frame indicates that data will be transmitted in the second interval, and wherein the temporary interval ends at an end time of a third sub-interval;

delivering a control frame to a next hop node in response to receiving the control frame in the temporary interval; and in response to determining that that the control frame has been successfully received by the next hop node, transitioning to a sleep state and maintaining the sleep state until a wake-up time, wherein the wake-up time arrives in the second interval, and a node transitions to an active state to receive the data at the wake-up time, wherein the first sub-interval is an interval from a start time of the first interval to a point in time earlier than an end time of the first interval by a predetermined length of time, the second sub-interval is the remaining interval of the first interval excluding the first sub-interval, and the third sub-interval is an interval from a start time of the second interval to a point in time later than the start time of the second interval by the predetermined length of time.

16. The method of claim 15, wherein the predetermined length of time is a sum of a double duration of the control frame and spacing between control frames.

17. The method of claim 15, further comprising:

in response to determining that there is no control frame received up to an end time of the third sub-interval, transitioning to a sleep state and maintaining the sleep state until an end time of the second interval.

18. A method for operating a node among a plurality of nodes in a wireless multi-hop network, wherein the plurality of nodes are synchronized to a period sequentially including a first interval and a second interval, and the plurality of nodes are in an active state at the start time of the first interval, the method comprising:

in a case where no control frame is received during a first sub-interval, waiting for a control frame to be received in a temporary interval in response to overhearing a control frame transmission in a second sub-interval, wherein the control frame indicates that data will be transmitted in the second interval and includes information for determining whether a node receiving the control frame is a last receiving node in a present period, and wherein the temporary interval ends at an end time of a third sub-interval;

determining whether the node is a last receiving node in the present period based on the received control frame, in response to receiving the control frame in the temporary interval; and in response to determining that the node is a last receiving node in the present period, transmitting the received control frame and then transitioning to a sleep state, which is maintained until a wake-up time, wherein the wake-up time arrives in the second interval, and a node transitions to an active state to receive the data at the wake-up time, wherein the first sub-interval is an interval from a start time of the first interval to a point in time earlier than an end time of the first interval by a predetermined length of time, the second sub-interval is the remaining interval of the first interval excluding the first subinterval, and the third subinterval is an interval from a start time of the second interval to a point in time later than a start time of the second interval by the predetermined length of time.

* * * * *